Oct. 17, 1944. J. HILLIER 2,360,677
OBJECT SUPPORT FOR ELECTRON MICROSCOPE
Filed Nov. 21, 1941

Inventor
James Hillier
By
Attorney

Patented Oct. 17, 1944

2,360,677

UNITED STATES PATENT OFFICE 2,360,677

OBJECT SUPPORT FOR ELECTRON MICROSCOPES

James Hillier, Collingswood, N. J., assignor to Radio Corporation of America, a corporation of Delaware Application November 21, 1941, Serial No. 419,896

2 Claims. (Cl. 250—49.5)

This invention relates to an object support for use in electron microscopes and more particularly to an object support which permits the tilting of the object at different angles in order to secure a stereoscopic picture.

The object support is in two parts, one of which is placed in the microscope in a predetermined position and has a hole passing through it at an angle. The second part, which carries the object, is inserted in the hole in the first part and by the rotation of this second part in the first part the object can be tilted to various angles and photographed successively in the various positions.

One object of the invention is to provide an improved object support for electron microscopes.

Another object of the invention is to provide an object support which will permit the tilting of the object to different angles.

Another object of the invention is to provide an object support which will permit the taking of stereoscopic pictures of the object.

Figure 1:
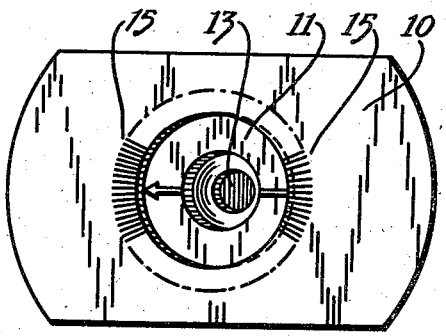
Figure 4:
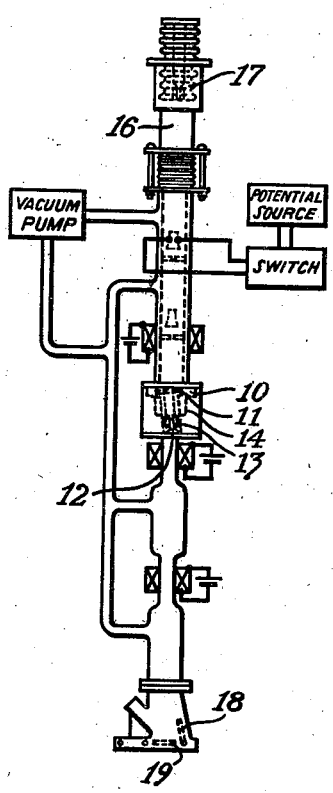
Figure 2:
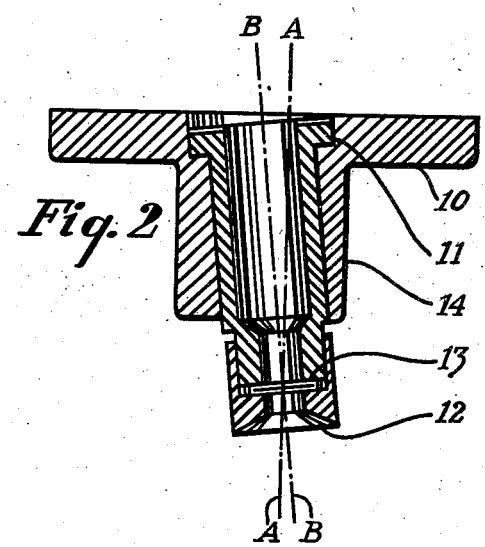
Figure 3A:
Figure 3B:

Other and incidental objects of the invention will be apparent to those skilled in the art from a reading of the following specification and an inspection of the accompanying drawing in which Figure 1 is a top view of the object support, Figure 2 is a horizontal section through the middle of Figure 1, Figures 3a and 3b show the appearance of an object at two positions of the rotatable member, and Figure 4 is a view in elevation of one form of an electron microscope. The invention is not limited, nor intended to be limited, to the precise form of the microscope shown, which is inserted merely to illustrate the relation of the object support of the invention to other elements of an electron microscope.

Referring first to Figures 1 and 2, the member 10 may be made of any appropriate material such, for example, as brass, and is of sufficiently small size so that it may be mounted in an appropriate object carrier, such, for example, as that disclosed in my application Serial No. 348,912, filed July 31, 1940, now Patent 2,272,843. This member 10 is mounted in a predetermined position in the object carrier with the plane of its upper face perpendicular to the electron beam and in predetermined orientation in relation to the instrument. The member 10 has a cylindrical downward extension 14 having a hole therein tilted at an appropriate angle. In the form of the invention illustrated, the angle is of the order of 6° but any suitable angle may be used according to the amount of stereoscopic effect desired. The member 11 passes through the slanted hole in the member 14 and, although movable in the hole, is not so loose therein as to become displaced in use. The tube 11 is provided with the cap 12 which holds the object 13, which may be mounted, for example, in a thin collodion film, in place at the end of the tube 11.

As may be seen from Figure 4, the object support consisting of the members 10 and 11 and containing the object 13 is mounted in an evacuated envelope 16 in the path of a beam of electrons derived from a cathode 17 or other appropriate source of electrons. The electron beam is focused on the object to be viewed, passes through the object and is directed toward a fluorescent screen 18 or photographically sensitized plate 19, so that a magnified electron image of the object to be viewed may be obtained. The general manner of operation of an electron microscope, and the relation of the object to be viewed to the other elements of the microscope are well known to those skilled in the art of electron microscopy. By way of example, U. S. Patents 2,233,286 and 2,301,302 describe electron microscopes of the general type illustrated in Figure 4.

The top of the tube 11 is provided with appropriate indicia and the surface of the member 10 may be graduated as indicated at 15 to indicate the orientation of the object. It will be apparent that the relative position of the index and graduations may be reversed, and that the fineness of the graduations is determined by the number of positions of the object it may be desired to use. For example, if only the two extreme positions of the object are to be used, then only one pair of marks is necessary.

It will be noticed that the axis A—A of the electron beam passes through the center of the object plane and intersects the axis B—B of the tube 11 in the plane of the object 13. This arrangement facilitates the relocating of the same portion of the field after the tube 11 has been rotated.

In using this device, the object is photographed in one position of the tube 11 and then, if the maximum stereoscopic effect for the particular apparatus is to be secured, the object holder 10, 11 is withdrawn from the microscope through the airlock, the tube 11 is rotated 180° in relation to the holder 10, and the holder 10 is then reinserted in the microscope but rotated 180° in relation to its original position. In the form of the apparatus shown, it will be apparent that this will secure a relative tilt of the two images of the order of 12°. The same field of view is found and rephotographed.

If a smaller tilt is desired, this may be accomplished by rotating the object holder 11 a correspondingly smaller amount. For example, Figures 3a and 3b show the type of effect which would be produced if the object being photographed were cubical and the tube 11 were rotated only 60° instead of 180°.

The orientation of the member 10 is determined, in the form shown, by its two parallel sides, but other equivalent means may be provided, such as index marks or a graduated scale.

The photographs obtained must, of course, be mounted in proper orientation to permit stereoscopic observation, as is usual in the preparation of stereoscopic photographs.

I claim as my invention:

1. An object holder for electron microscopes including a member adapted to engage the microscope and rotatable in a plane perpendicular to the optical axis to a plurality of positions, and a tubular object-supporting member passing through the first member at an angle, with the axis of the tubular member intersecting the optical axis in the object plane, said tubular member being rotatable about its own axis, and both of said members carrying indicia of their rotational positions.

2. An object holder for electron microscopes including a member adapted to engage the microscope and rotatable in a plane perpendicular to the optical axis to a plurality of positions, and a tubular object-supporting member passing through the first member at an angle, with the axis of the tubular member intersecting the optical axis in the object plane, said tubular member being rotatable about its own axis.

JAMES HILLIER.